Aug. 15, 1967  F. B. HARLEY  3,335,468
CONNECTOR DEVICES

Filed Feb. 15, 1965

INVENTOR
FRANK B. HARLEY
BY
Holcombe, Wetherill & Brisebois
ATTORNEYS

Aug. 15, 1967  F. B. HARLEY  3,335,468
CONNECTOR DEVICES

Filed Feb. 15, 1965  5 Sheets-Sheet 3

INVENTOR
FRANK B. HARLEY
BY
Holcombe, Wetherill + Brisebois
ATTORNEYS

Aug. 15, 1967   F. B. HARLEY   3,335,468
CONNECTOR DEVICES

Filed Feb. 15, 1965   5 Sheets-Sheet 4

INVENTOR
FRANK B. HARLEY

BY
Holcombe, Wetherill & Brisebois

ATTORNEYS

Aug. 15, 1967   F. B. HARLEY   3,335,468
CONNECTOR DEVICES

Filed Feb. 15, 1965   5 Sheets-Sheet 5

INVENTOR
FRANK B. HARLEY
BY
Holcombe, Wetherill & Brisebois
ATTORNEYS

United States Patent Office 3,335,468
Patented Aug. 15, 1967

3,335,468
CONNECTOR DEVICES
Frank Bernard Harley, Egham, England, assignor to Harley Patents (International) Limited, Egham, England, a company of England
Filed Feb. 15, 1965, Ser. No. 432,784
Claims priority, application Great Britain, Feb. 24, 1964, 7,617/64
8 Claims. (Cl. 24—123)

This invention relates to connector devices suitable for connecting on another part a member such as a cord, rope, chain, wire, webbing or strap or the like and is concerned particularly with simple devices which will be inexpensive to produce and operate.

According to one aspect of the present invention a connector device comprises a generally flat body affording first and second opposite faces, an aperture extending through the body between the first and second faces, an abutment support which is adapted to lie, in a normal position, substantially flat upon the said second face of the body, co-operating interconnecting means formed on the body and abutment support respectively, said interconnecting means being arranged normally to prevent complete separation of the body and abutment support but permitting relative movement thereof to a displaced position, the abutment support affording a supporting portion which in the said normal position partially overlies the aperture in the body, the supporting portion in the displaced position being spaced from the aperture to permit an abutment on another part to be passed through the aperture from the first face of the body and co-operatively engaged with said supporting portion whereby the abutment is prevented from passing back through the aperture when the body and abutment support are returned to the normal position.

According to another aspect of the invention a connector device comprises a body having in it an aperture through which an abutment on another member may pass, the aperture communicating with a closed ended slot of a width less than the largest dimension of the abutment, the slot extending away from the aperture in such a manner that a portion of the other member to one side of the abutment during displacement of it from the aperutre along the slot to the closed end thereof has to make one or more changes in direction amounting in total to at least 90°. The slot may extend generally radially from a circular aperture and thereafter curve back around the aperture to the opposite side thereof, and the slot may have a number of short extensions from a side or sides thereof to accommodate a number of abutment-carrying members. As indicated above in order to enable the device to be suitable for alternative purposes the aperture and the slot may be so dimensioned to be capable of receiving and securing to the device alternatively a knotted cord, a looped link chain or a cable having projections secured thereto.

According to a further aspect of the invention a connector comprises a body, an aperture extending through the body, a slot extending from one edge of the body to one region of the aperture, a closed ended passage in the body extending from another region of the aperture, and a closure member partially overlying the aperture, the closure member having an open ended opening therein which by movement of the closure member can either overlie the slot or the opening in the body.

The invention also envisages the provision of a dual purpose device which can serve to interconnect both wires, chains, cords, ropes as well as webs or straps.

The invention may be carried into practice in a number of ways but several specific embodiments will now be described by way of example with reference to the accompanying drawings in which:

FIGURE 4b is a section on the line B—B of FIGURE 4a;

Figures 1, 2:
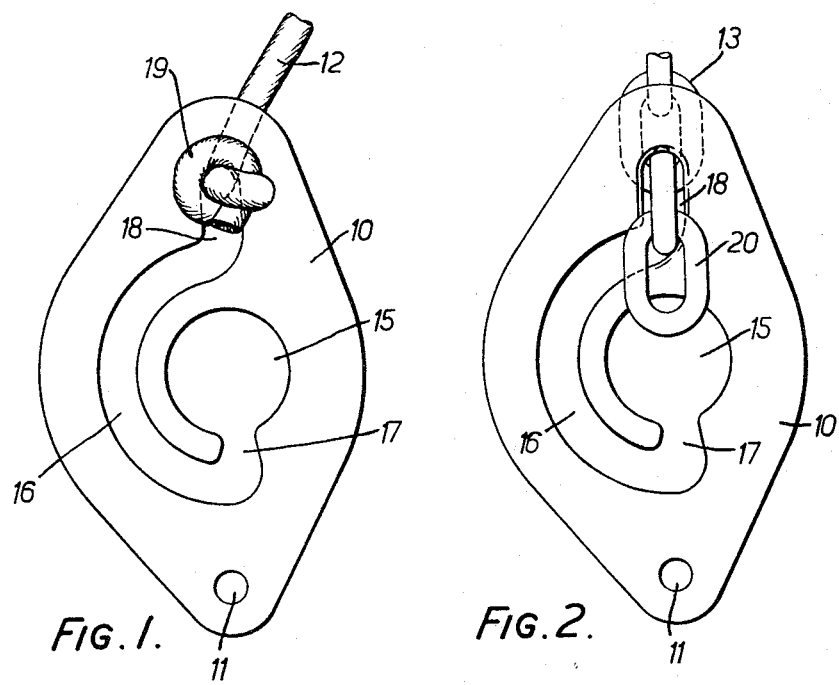
FIGURE 1 shows a device for connecting a cord, rope, chain or the like to another part in this case connected to a nylon cord.
FIGURE 2 shows the device of FIGURE 1 in this case connected to a chain.

In the device of FIGURES 1 and 2 a flat generally oval shaped plate 10 has at one end a hole 11 by which the plate can be secured to another part, for example by a hook, or by a bolt. The plate 10 also has in it a generally inverted "question-mark" shaped hole by which, in the case of FIGURE 1, a nylon cord 12 can be secured to the plate 10 and in the case of FIGURE 2, by which a chain 13 of oval links can be secured to the plate 10.

As indicated in these two figures the "question-mark" shaped hole includes a generally circular aperture 15 and an arcuate slot 16 connected at one end to the aperture 15 by a generally radial slot 17 and terminating at its other end in a straight stem portion 18 situated at the end of the plate 10 opposite to the hole 11.

The size of the aperture 15 depends upon the part to which the plate is to be secured. For example, in the two embodiments shown in FIGURES 1 and 2 the aperture 15 is large enough to have passed through it either a knot 19 on the end of the nylon cord 12 or a link 20 of the chain 13. The arcuate slot 16 and the straight stem portion 18 however, are of such width that neither the knot 19 nor a flat link of the chain 13 can pass through these parts of the plate.

In this way therefore when either a cord 12 or a chain 13 is in the position shown respectively in FIGURES 1 or 2 a tension can be applied to the cord or the chain, whilst the plate is secured to another part by means of the hole 11, with no danger of the knot or a link of the chain passing through the arcuate slot 16 or the straight stem portion 18 even in the event of a jerking of the cord or the chain, since in order to release either the cord or the chain it has to be passed completely round the arcuate slot 16 back through the radial slot 17 and then through the circular aperture 15.

The device shown in FIGURES 1 and 2 can have many applications. For example the arrangement shown in FIGURE 1 could provide a simple connection for a clothes line and could also have many applications in camping or in lashing of equipment.

Figure 3:
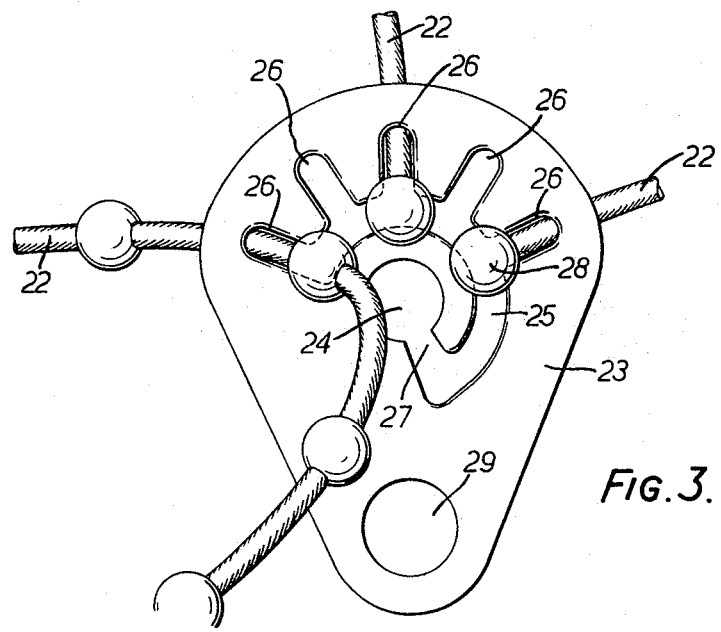
FIGURE 3 shows a further device securing a number of cables.

In the embodiment of FIGURE 3 a similar principle is employed for securing a number of cables 22 to a generally triangular plate 23 which in this case has a generally central circular aperture 24 connected by an arcuate slot 25 to five short generally radial slots 26, each of which is disposed on the opposite side of the aperture 24 to a necked portion 27 of the slot so that once the cables are secured a jerking on the cables does not produce release, since each of the cables has to be passed out of its radial slot 26 around the arcuate slot 25 through the necked portion 27 and into the central aperture 24 in order to allow swaged balls 28 on the cables to pass through the plate. As shown in FIGURE 3 the balls can either be on the ends of the cable or can be at intervals along the cable to allow the cable to be taken up through the plate and to allow the cable to be latched to the plate in a number of different positions. Here again the plate as a whole can be secured to another part through an opening 29.

The device of FIGURE 3 can, of course, like the device of FIGURES 1 and 2, have many applications but the fact that it can have secured to its several wires or ropes makes it particularly suitable for use, for example, in the erecting of a tent or marquee. If desired the device of FIGURE 3 could be altered to afford radial slots all around the circumference of the plate, so that it could be placed at the top of a tent pole and have extending away from it in all directions a number of guy ropes. Where a cord or rope is used it may be convenient to adjust the tension in the cord or rope by employing a looped-slip knot (formed by passing one loop of a clove hitch through the other and drawing tight) which can be readily formed or undone without the end of the rope being available.

Figure 4A:
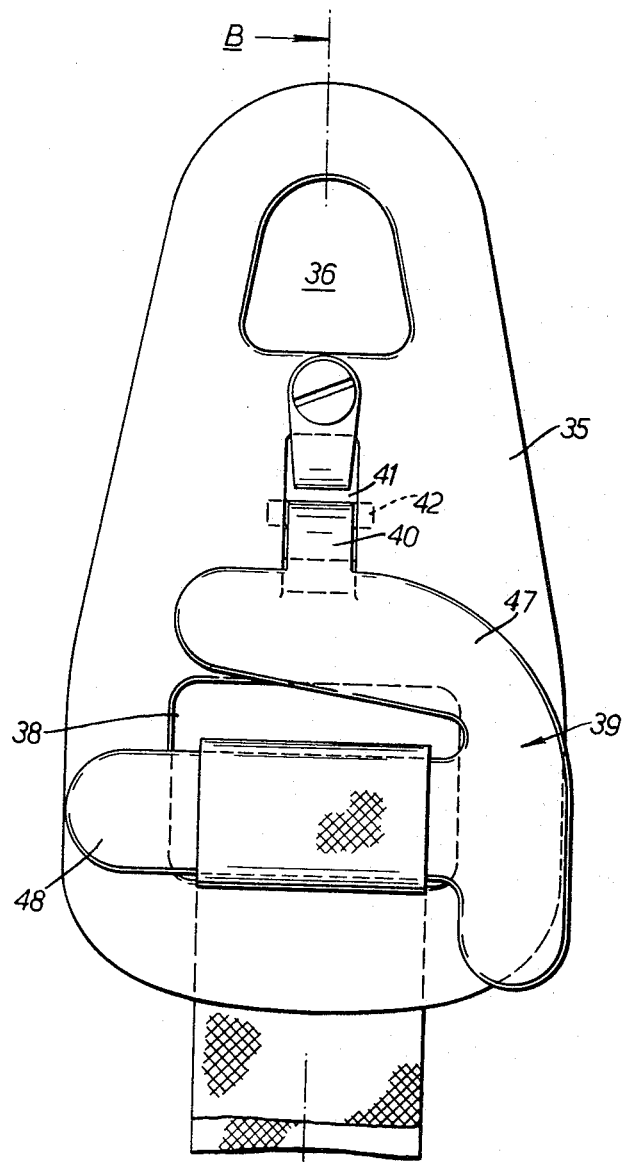
FIGURE 4a shows a device for securing a loop of strap or piece of webbing.
Figure 4B:
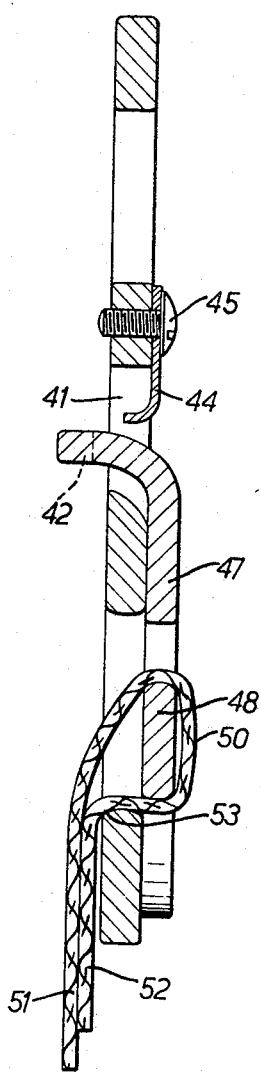

In a further embodiment shown in FIGURES 4a and 4b a simple device is shown for securing a loop of webbing or strap. The main object of this device is to enable the loop to be secured without the necessity of the free end of the strap being passed through the device. For example the device can be used where no free end is available or exists. The device comprises a main generally triangular body 35 having an opening 36 at one end by which it can be secured to another part. Towards the other end the body 35 has a generally rectangular opening 38 overlying which is a gripping member 39 having a projecting portion 40 which extends through a slot 41 in the plate. The projecting portion 40 is provided with turned back lugs 42 on the reverse side of the body 35 to prevent the gripping member 39 being detached. In practice the slot 41 is long enough to enable the gripping member 39 to be released by turning through 90° at which time the lugs 42 can pass up through the body 35. This is normally prevented, however, by a retainer hook 44 which partially overlies and extends into the slot 41 and which is secured to the body 35 by a screw 45. However, the retainer hook 44 permits considerable freedom of movement of the gripping member 39, so that it can be hinged upwards from the plane of FIGURES 4a and it can also be twisted slightly if desired. As shown in FIGURE 4a the gripping member has a main arcuate portion 47 extending from the projecting portion 40 across and to one side of the rectangular opening 38. Extending from the arcuate portion 47 is a transverse bar 48 which passes across the lower half of the rectangular opening 38 and around which a loop 50 of webbing or strap can be slipped after it has been passed up through the rectangular opening 38 with the gripping member 47 slightly raised and if necessary twisted to one side. Clearly in this embodiment a tension on both runs of the loop of webbing or strap will cause the gripping member 39 to bear on the face of the body 35 to prevent the loop 50 from passing off the end of the transverse bar 48. If desired the parts may be so shaped and constructed that a tension on the run 51 of the loop (see FIGURE 4B) will cause the other run 52 to bear against a curved margin 53 of the rectangular opening 38 and so grip this run 52 to the body 35 and prevent it from slipping relatively to the transverse bar 48.

Figure 5:
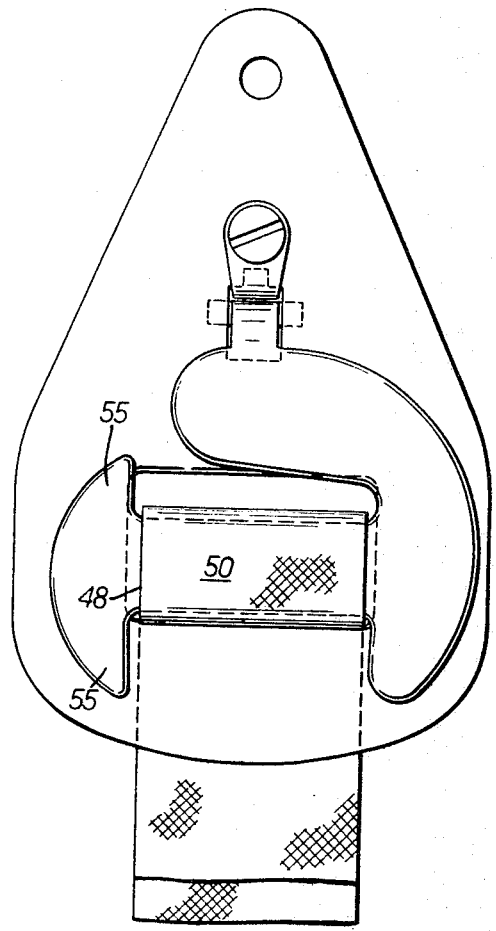

FIGURE 5 shows an embodiment similar in many respects to the embodiment of FIGURES 4a and 4b but in this case the transverse bar 48 is provided with a pair of integral ears 55 further to ensure that the loop 50 cannot inadvertently pass off the end of the bar 48 in the event of the loop being jerked.

Figure 6:
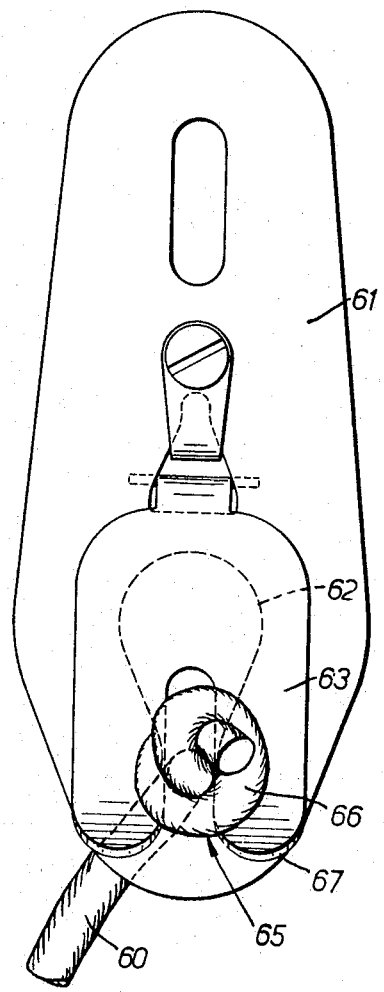
FIGURES 6 to 8 show further devices for securing a cord, rope, cable or chain.

FIGURE 6 illustrates a further embodiment in which a knotted cord 60 (or a cable or chain or the like) can be simply connected to a plate 61. In this case the plate 61 has in it a generally pear-shaped opening 62 overlying which is a U-shaped retaining member 63 secured to the plate 61 in a similar manner to the gripping member 39 of FIGURES 4a and 4b. In this case the retaining member 62 affords a slot 65 which overlies part of the narrow end of the pear-shaped opening 62 in the plate 61. The slot 65 however, is of limited length so that a tension in the cord 60 causes its knot 66 to bear on the sides of the retaining member 63 in turn causing this to bear on the surface of the plate 61. Accordingly in this embodiment the cord is secured to the plate 61 by lifting the retaining member 63 by means of upturned finger pieces 67 until the knot 66 can be passed through the wide end of the pear-shaped opening 62 and then slipped over the top of the retaining member 63 to the position shown.

Figure 7:
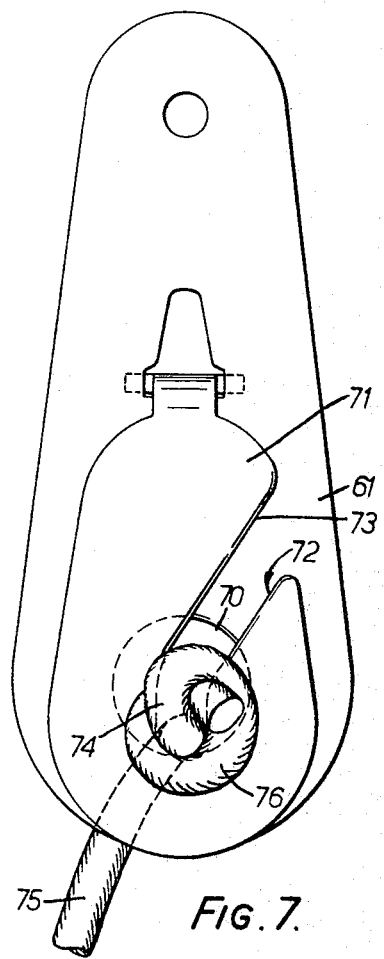

In the embodiment of FIGURE 7 a construction similar to that of FIGURE 6 is shown but in this case the plate 61 merely has a circular opening 70 and the retaining member 71 has in it a generally L-shaped slot 72 having a long arm 73 extending obliquely to the length of the plate 61 and a short arm 74 which overlies the opening 70. In this embodiment therefore the cord 75 with its knot 76 is passed through the opening 70 whilst the retaining member 71 is raised. The knot is then brought over the top of the retaining member 71 and the run of the cord slipped down the slot 72 until the knot overlies the short arm 74. Thereafter a tension in the cord 75 will maintain the retaining member 71 flat against the plate 61 and prevent release of the cord.

Figure 8:
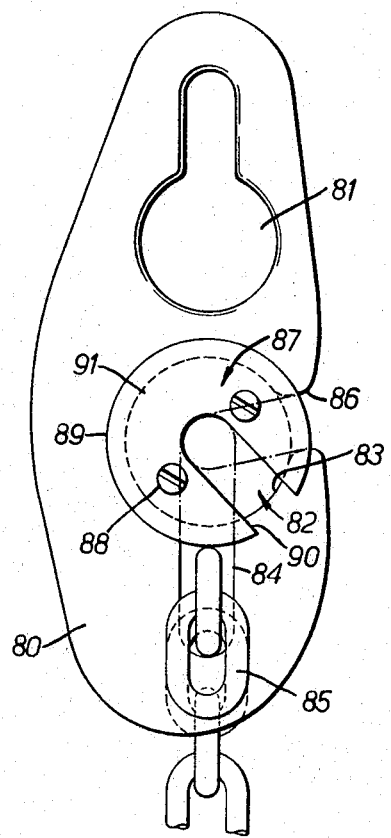

FIGURE 8 illustrates a further device in this case shown utilized for securing a chain although the device can equally be used for securing cords, cables or the like. A flat plate 80 has at one end of it a key-hole shaped opening 87 by which the plate can be secured to another part. The plate has adjacent its other end a further key-hole 82 formed by a circular opening 83 and a stem 84, the stem 84 being dimensioned to allow the link of a chain 85 to lie flat within it, but an adjacent link not to pass through it.

Adjacent one side of the plate 80 the circular opening 83 has extending from it a short open slot 86 for a purpose to be described.

In order to retain the chain 85 within the stem 84 a circular retainer 87 is provided which is formed of two identical halves secured together by screws 88 and having abutting portions 91, which each extend half way through the plate 80, and flanges 89, which rest on the surface of the plate 80 to hold the retainer within the circular opening 83, but which allow it to be rotated from the full line position of FIGURE 8 to either of two chain dotted positions wherein a radial slot 90 in the retainer can either be aligned with the short slot 86 or with the stem 84. Accordingly to insert the chain into the position shown in FIGURE 8 the retainer 87 is turned so that the radial slot 90 is in line with the slot 86 so that a link of the chain can be passed through the slots to within the circular opening 83. Thereafter the retainer can be turned through something like 100° with the link still within the slot 90 until this slot is in line with the stem 84, whereafter the chain can be slipped to the position of FIGURE 8. Thereafter the retainer can be turned back to an appropriate extent to block off the stem 84 and to prevent release of the chain. In practice once the chain is clear of the slot 86 a tension on the chain will cause the retainer to rotate until the slot 90 is in the line with the stem 84.

Figure 9:
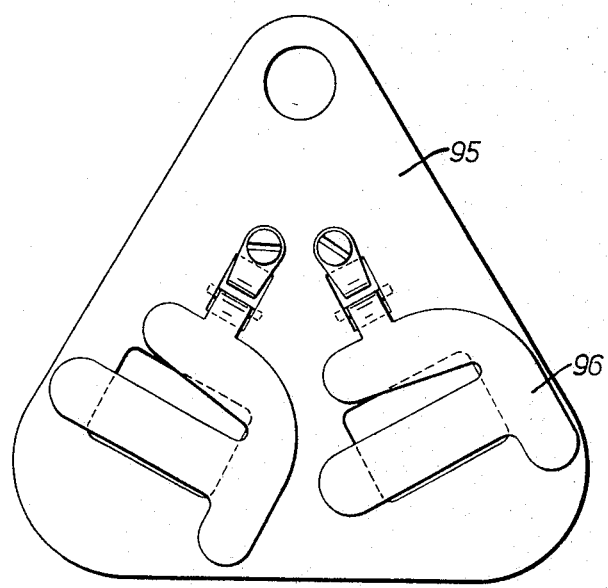
FIGURE 9 shows a device for securing two straps or pieces of webbing.

FIGURE 9 shows a triangular plate 95 provided with two gripping members 96 which allow two straps to be secured in the same manner as in the embodiment of FIGURES 4a and 4b.

Figure 10:
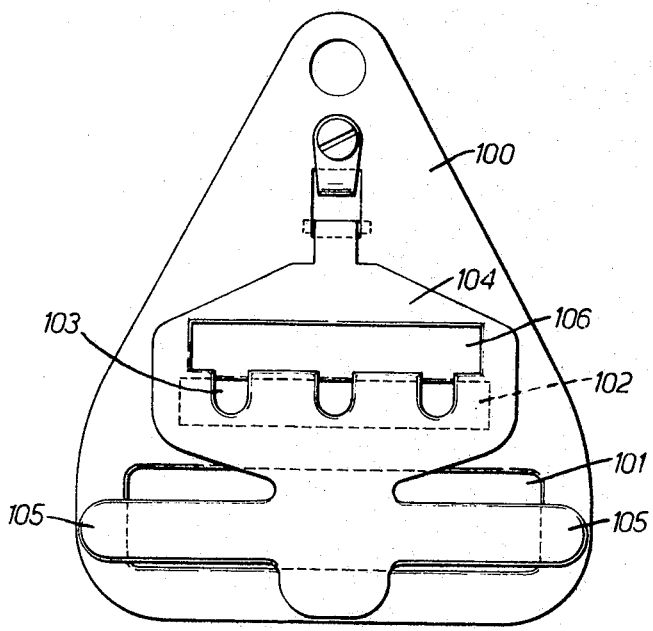
FIGURE 10 shows an embodiment to which cords, ropes, chains or the like and also two straps or pieces of webbing can be secured.

Finally FIGURE 10 shows a composite arrangement wherein a plate 100 has long rectangular openings 101 and 102 overlying which is a latching member 104 formed at its lower end with a pair of transverse members 105 for securing a pair of straps passed up through the rectangular opening 101 in the same manner as in the embodiment of FIGURES 4a and 4b. The latching member 104 also has a rectangular hole 106 formed with three short slots 103 to retain three knotted cords within these slots after they have been passed up through the rectangular opening 102.

What I claim as my invention and desire to secure by Letters Patent is:

1. A connector device comprising a generally flat body having first and second opposite faces, a first abutment on said body by means of which it may be attached to another object, an aperture in said body spaced from said first abutment and extending through the body between said first and second faces, an abutment support for a second abutment, which support has a main portion that is adapted to lie, in a normal position, substantially flat upon the said second face of said body and substantially to one side of said aperture, cooperating interconnecting means formed on the body and abutment support respectively, said interconnecting means being arranged to normally prevent complete separation of the body and abutment support but permitting relative movement thereof to a relatively displaced position, said abutment support having a free end portion and when in said normal position extending from said main portion transversely of a line directly connecting said first abutment and said aperture and at least partially overlying the aperture in said body, said free end portion being spaced from said aperture to permit a loop on another part to be passed through said aperture from the first face of the body and slipped over said free end portion when said abutment support and body are in their relatively displaced position, whereas said abutment support prevents said loop from passing back through said aperture when said abutment support and body are returned to said normal position.

2. A connector as claimed in claim 1 in which said body is pierced by an additional aperture and comprising an additional abutment support connected to cooperate with said additional aperture in the same manner that said first mentioned abutment cooperates with said first mentioned aperture.

3. A connector as claimed in claim 1 in which said abutment support is provided with two free ends.

4. A connector as claimed in claim 1 in which said free end carries transverse projections which inhibit said loop from slipping off said free end.

5. A connector as claimed in claim 1 in which said abutment support is movable in a plurality of planes relative to said body.

6. A connector device as claimed in claim 1 wherein the interconnecting means comprise a tongue on the abutment support and a slot in the body, through which the tongue passes, the tongue having at least one lug extending over the first face of the body to prevent separation of the body and abutment support in the normal position.

7. A connector device as claimed in claim 1 wherein the abutment support has a longitudinal edge which in the normal position lies adjacent a longitudinal edge of the margin of the aperture, whereby of the two runs of strap from the loop one run may pass between the said edges, and the other run when lying adjacent the first with a tension therein, will draw the bar in a direction to grip the said one run between the said edges.

8. A connector device comprising a generally flat body having first and second opposite faces, a first abutment on said body by means of which it may be attached to another object, an aperture in said body spaced from said first abutment and extending through the body between said first and second faces, an abutment support for a second abutment, which support is adapted to lie, in a normal position, substantially flat upon the said second face of said body, cooperating interconnecting means formed on the body and abutment support respectively, said interconnecting means being arranged to normally prevent complete separation of the body and abutment support but permitting relative movement thereof to a relatively displaced position, said abutment support having a free end portion and when in said normal position extending transversely of a line directly connecting said first abutment and said aperture and at least partially overlying the aperture in said body, said free end portion being spaced from said aperture to permit a loop on another part to be passed through said aperture from the first face of the body and slipped over said free end portion when said abutment support and body are in their relatively displaced position, whereas said abutment support prevents said loop from passing back through said aperture when said abutment support and body are returned to said normal position, said body being pierced by a second aperture and said abutment support being pierced by a third aperture having a relatively wide portion and at least one relatively narrow portion narrower than said second aperture, said second and third apertures being positioned to permit a member as thick as the maximum width of each of said second and third apertures to pass therethrough when said body and abutment support are in their relatively displaced position, whereas only the narrow part of said third aperture overlies and communicates with said second aperture when said body and abutment support are in their normal position.

References Cited
UNITED STATES PATENTS

| | | |
|---|---|---|
| 404,615 | 6/1889 | Giroux. |
| 1,274,030 | 7/1918 | France. |
| 1,322,747 | 11/1919 | Axe _____ 24—116 XR |
| 1,785,967 | 12/1930 | Mix _____ 24—197 XR |
| 3,060,537 | 10/1962 | Hatfield _____ 24—197 XR |
| 3,121,270 | 2/1964 | Broek _____ 24—74 |

FOREIGN PATENTS

| | | |
|---|---|---|
| 210,602 | 2/1924 | Great Britain. |
| 549,625 | 11/1942 | Great Britain. |

BERNARD A. GELAK, *Primary Examiner.*